Dec. 18, 1934. R. R. BROWNING 1,984,914
OPHTHALMIC MOUNTING
Filed Aug. 10, 1932
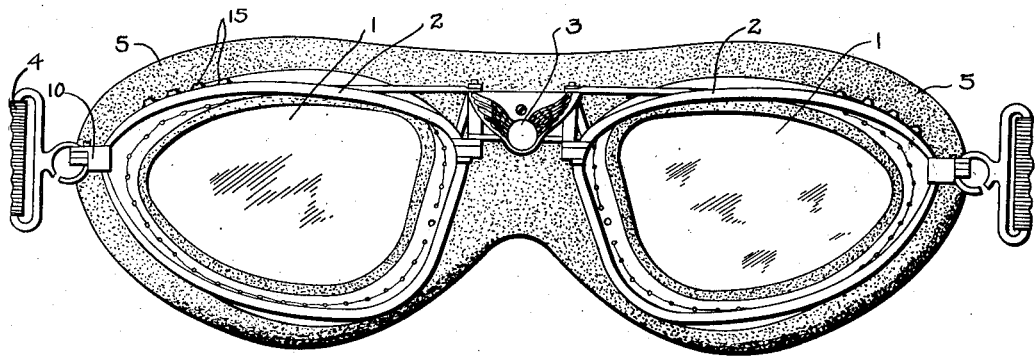
FIG. I
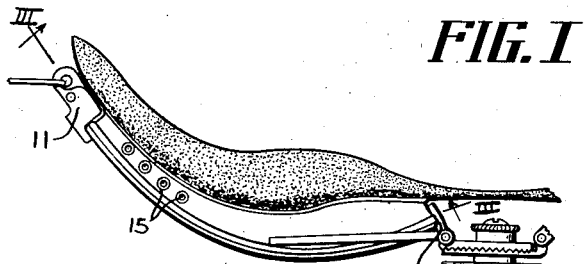
FIG. II
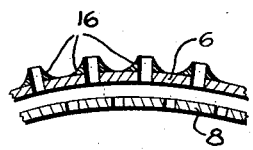
FIG. IV
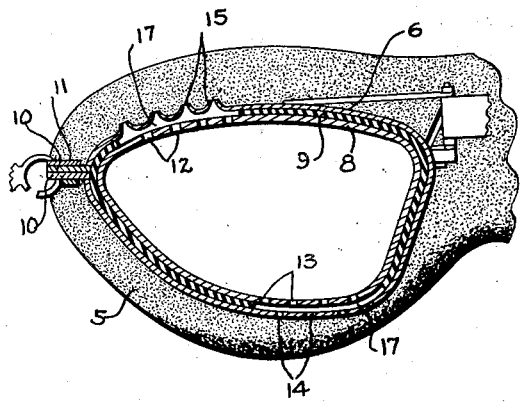
FIG. III
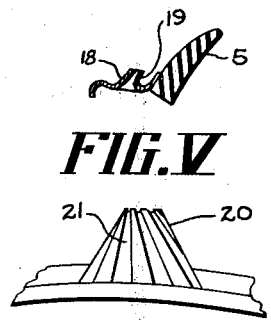
FIG. V
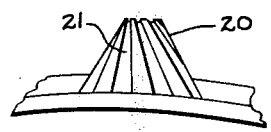
FIG. VI
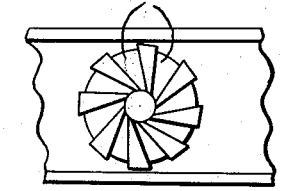
FIG. VII
INVENTOR
Ralph R. Browning.
BY
Harry H. Styll
ATTORNEY Patented Dec. 18, 1934

1,984,914

UNITED STATES PATENT OFFICE 1,984,914

OPHTHALMIC MOUNTING

Ralph R. Browning, Southbridge, Mass., assignor to American Optical Company, Southbridge, Mass., a voluntary association of Massachusetts Application August 10, 1932, Serial No. 628,194

2 Claims. (Cl. 2—14)

This invention relates to ophthalmic mountings and has particular reference to aviator's protection goggles and the like.

One of the principal objects of the invention is to provide for the eye cups of goggles a ventilator which will be operated by air currents.

Another object of the invention is to provide simple, efficient and economical means for ventilating the interior of the eye cups automatically through the wind pressure exerted by the motion of the wearer through the air.

Another object of the invention is to provide for the eye cups of goggles a ventilator operated by air currents, which will cause a partial vacuum to be created within the eye cups.

Another object of the invention is to provide for the eye cups of goggles a ventilator operated by air currents, which will cause a partial vacuum to be created within the eye cups regardless of the direction in which the wearer is looking.

Another object of the invention is to provide for the eyecups of goggles a ventilator operated by air currents, which will not allow air to be blown directly into the eye cups regardless of the direction in which the wearer is looking.

Another object of the invention is to provide improved face contacting means for goggles for aviators or the like.

Another object is to provide a readily detachable face contacting member for goggles of this type, in which the parts surrounding the respective eyes will always be maintained in proper alignment with respect to each other.

Other objects and advantages of the invention will become apparent from the following description taken in connection with the accompanying drawing, and it will be apparent that many changes in the details of construction and arrangement of parts may be made without departing from the spirit of the invention as expressed in the appended claims. I, therefore, do not wish to be limited to the exact details of construction and arrangement shown, the preferred form only having been shown by way of illustration.

Referring to the drawing:

Fig. I is a front view of a pair of goggles embodying the invention;

Fig. II is a fragmentary plan view of Fig. I;

Fig. III is a section on line III—III of Fig. II looking in the direction of the arrows;

Fig. IV is a partial sectional view similar to Fig. III, showing a modification;

Fig. V is a transverse sectional view of the upper wall and of the outer eye cup, showing another modification;

Fig. VI is a partial front view of a goggle eye cup embodying a further modification.

Fig. VII is a plan view of the structure shown in Fig. VI.

It is well known that because of the high speed at which aviators travel through the air, strong wind pressure is exerted against their goggles, making it necessary to fit the goggles very close to the face. It is therefore essential that the eye cups of the goggles always be ventilated to prevent the lenses from becoming steamed or fogged. The ventilation devices in use at present have been found to be expensive and to add considerably to the cost of manufacture of the goggles. It is, therefore, an object of this invention to provide an improved ventilating device for goggles for aviators and the like, which will be simpler and more economical to manufacture than the devices of the prior art, and will at the same time meet all requirements of properly ventilating the eye cups.

It is also an object of this invention to provide an improved face contacting member which may be more easily attached to the goggle eye cups in the proper position and which will be more efficient in use than the face contacting members employed in the prior art.

Referring more particularly to the drawing wherein similar reference characters denote corresponding parts throughout, the goggles embodying the invention comprise a pair of lenses 1, which are carried in the eye cup frames 2 and connected by a bridge member 3, the goggles being held in place on the face by the head bands 4. The eye cups 2 are provided with a soft, resilient face contacting member 5, preferably of soft rubber or other yielding material. This member 5 is shown formed all in one piece although it is attached separately to the respective eye cups, as will be hereinafter described.

The frames 2 and the face contacting member 5 are shaped in general contour to that of the orbital arches of the wearer's face. The frames 2 are comprised each of two members, an outside eyecup member 6 which has a front flange or lens retaining seat 7 and a removable inner eyecup member 8, which is spaced from the outer eye cup 6. Between the eye cups 6 and 8 are projecting portions 9 of the resilient face contacting member 5. The projections 9 of the member 5 are preferably secured to the inner eye cup members 8 by sewing or the like. The members 8 are then clamped within the outer eye cup member 6 and this serves as a securing means for the face contacting member 5.

The inner eye cups 8 are retained within the eye cups 6 by the bringing together of the endpieces 10 of the eye cups and securing them by means of the clamps 11.

The inner eye cups 8 have at their upper and lower sides a series of openings 12 and 13 respectively. These openings may be of any desired size and number. The outer frames 6 have on their lower sides a series of openings 14 and at their upper sides are formed the projecting members 15. These members 15 are preferably frustro-conical because this form has been found to produce better results than other shapes, and may be formed by punching outwardly through the walls of the frames 6, as shown in Fig. III, or may be separate hollow frustro-conical members 16 soldered or otherwise secured to the eye cups over openings in the frames as shown in Fig. IV. The openings at the outer ends of these members 15 are shown as being disposed substantially at right angles to the normal direction of air flow. The sloping sides of the conical members may be formed with straight elements, in which there are truly frustro-conical surfaces, or they may be formed with elements slightly concave or convex in which case they are not of course truly frustro-conical surfaces. For the purposes of this specification and the appended claims, however, the term "frustro-conical" is to include all such variations. In any event, these sloping surfaces serve to direct air outward and across the opening, thus causing more air to pass over the opening than if the sides were not sloping.

The openings 12 and 13 in the inner eyecups 8 are so placed that when the frames are assembled they will be in staggered relation with the members 15 and the openings 14 respectively, in the outer frame 6. This will prevent any air from entering the eye cups directly. It will be noted also that the projection 9 of the member 5 is cut away at 17 adjacent the openings 12, 13, 14 and 15 at the top and bottom of the eye cups, so that the air can circulate freely between the openings.

It will be apparent that air rushing over the upper ends of the members 15 will cause a suction tending to exhaust the air from the inside of the eye cups 2. This in turn tends to suck the air into the eye cups 2 through the openings 13 and 14, thus causing a constant ventilation through the eye cups 2, which will prevent fogging and steaming of the lenses.

It will be noted that as the frame members 6 are curved the members 15 will not all project in the same direction but will project at different angles. This insures ventilation at all times, no matter in which direction the wearer is looking. Even if some of the openings 15 should be directly toward the wind and air should enter the space 17 between the frames 6 and 8 the air rushing over the other members which are at different angles than the one through which the air enters, would suck this air out again before it could enter the eye cup.

In Figure V there is shown a modification similar to the construction of Fig. III, but differing therefrom in that the front 18 of the cone member forms a much more acute angle with respect to the eye cup wall than the rear surface 19. It will be noted that the rear surface 19 is shown almost at right angles to the eye cup wall. The side walls of these conical members are sloped substantially the same as those illustrated in Fig. III. It will readily be seen that the rear surface 19 does not need to be sloping because the air currents cannot come from the rear on account of the face of the wearer and the member 5. Making this surface more nearly perpendicular to the eye cup wall makes it possible for the front surface 18 to be given a greater slope.

In Figures VI and VII there is shown a further modification in which the frustro-conical member 20 has a series of spirally arranged tapering grooves 21 leading from its base to its opening in its outer end. These grooves serve to more positively direct the air outwardly and past the opening to increase the ventilating effect. The spiral arrangement of these grooves tends to give the air a whirling motion and thus regulate its action in ventilating the eyecup. The tapering of the grooves produces a nozzle effect at the openings and thus increases the ventilating action by causing the air to rush past the openings with a greater velocity.

From the foregoing it will be seen that I have provided simple, efficient and economical means for ventilating the eye cups of eye protectors by using the air currents across them to cause air to be drawn out of the eye cups and also that I have provided a face contacting means which is in one integral piece and shaped to the contour of both orbital brims, whereby the portions surrounding the respective eyes will always be maintained in the proper alignment with respect to each other.

The ventilating means described is easy to construct, costing much less than the more complicated devices in present use. Tests have proved them just as effective in every respect from a ventilation standpoint as previously known types, and much more rugged.

Having described my invention, I claim:

1. In a device of the type described, a goggle eye cup, the wall of said eye cup having an opening therein and an outwardly drawn portion around said opening and tapering outwardly to form a projection on the eyecup wall having inclined sides with an opening in its outer end which is smaller in diameter than the opening in the eyecup wall, whereby the rushing of air upwardly of the inclined sides and past the outer opening of the projection will cause air to be sucked from the interior of the eye cup.

2. In a device of the character described, a goggle eyecup and vent means projecting outwardly from the wall of said cup substantially normal thereto, said means having an opening therethrough communicating with the air on one side and with the interior of the cup on the other, said vent walls being inclined outwardly toward the air side of the opening therein and arranged so that air rushing upwardly of the incline and past the outer opening will cause air to be drawn from the interior of the eyecup through said vent.

RALPH R. BROWNING.